United States Patent Office 3,108,412
Patented Oct. 29, 1963

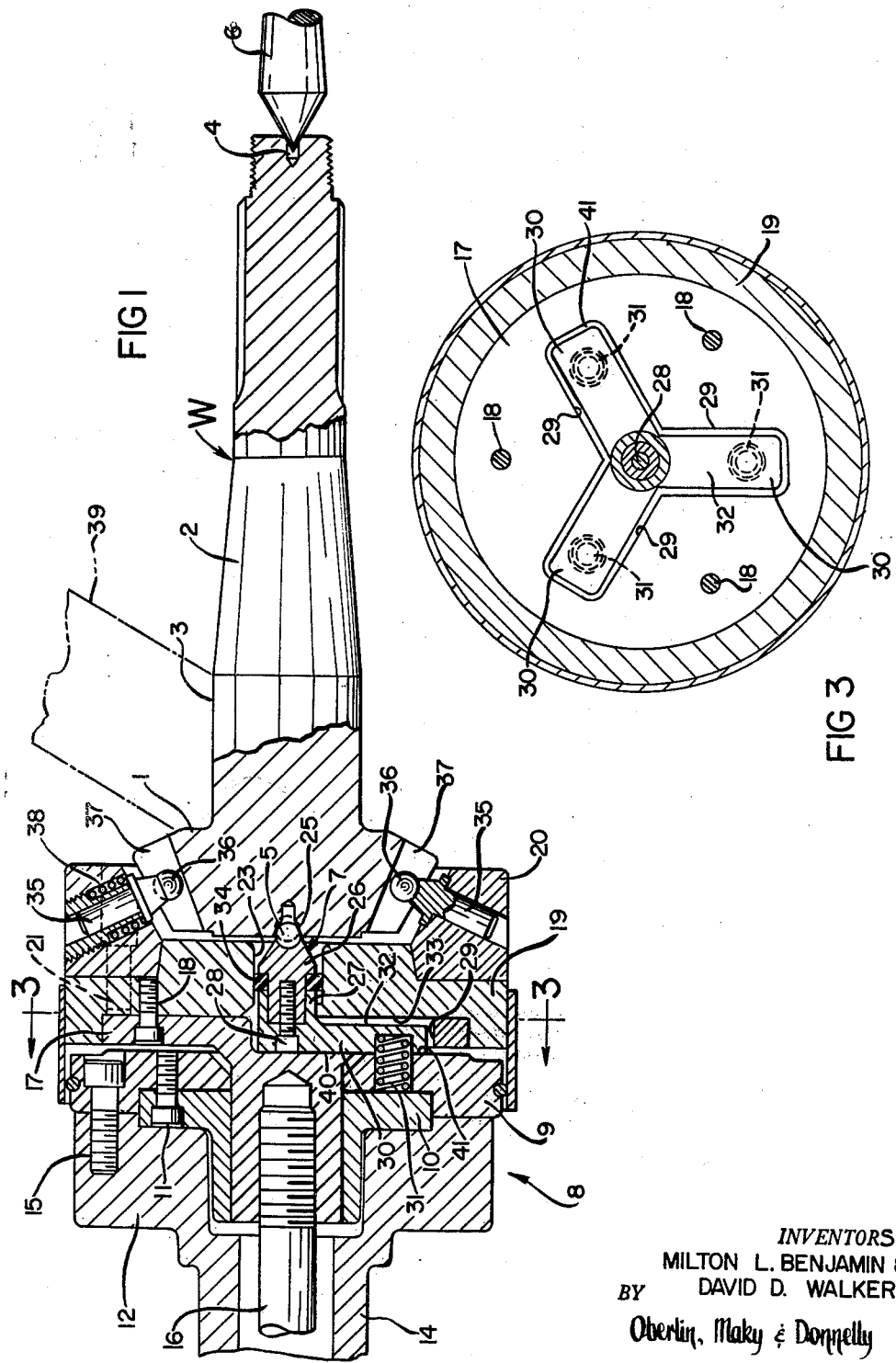

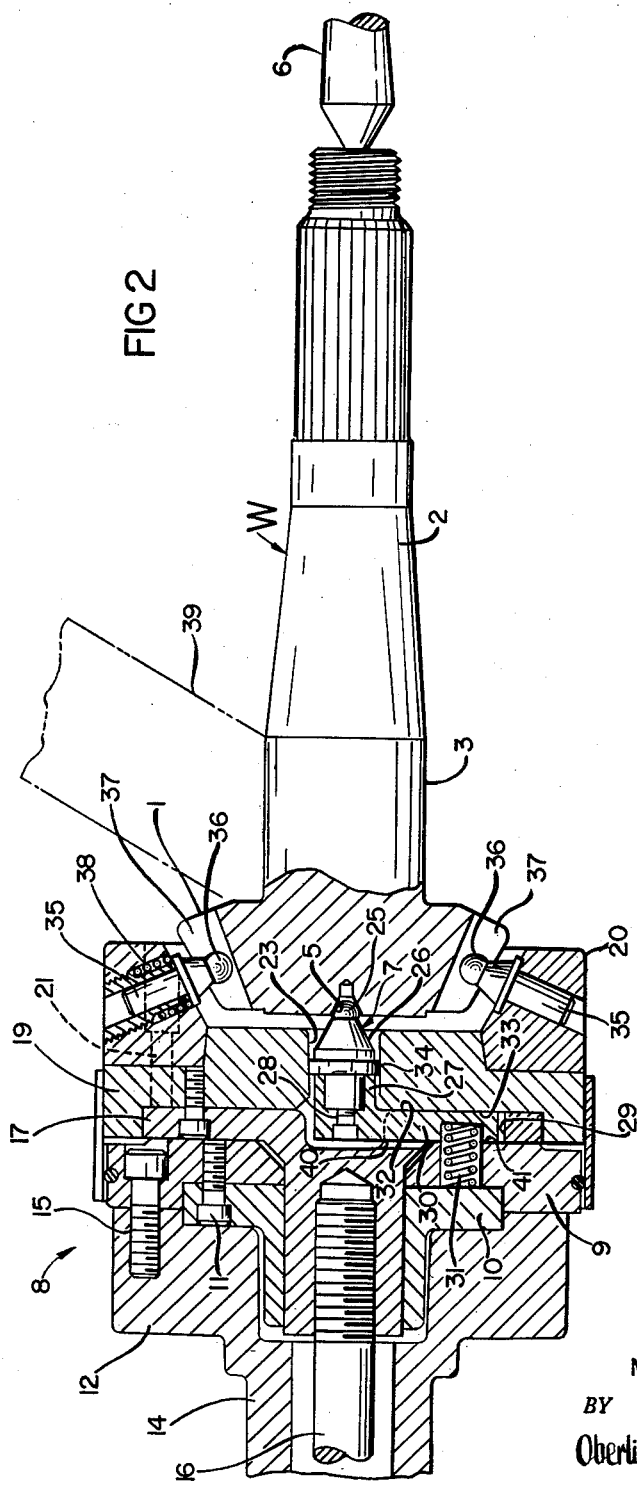

3,108,412
CHUCK FOR GEARS AND THE LIKE
Milton L. Benjamin, Shaker Heights, and David D. Walker, Chagrin Falls, Ohio, assignors to Erickson Tool Company, Solon, Ohio, a corporation of Ohio
Filed Oct. 13, 1960, Ser. No. 62,479
8 Claims. (Cl. 51—237)

The present invention relates generally as indicated to a chuck for gears and the like, and more particularly, to a chuck adapted for use as with cylindrical-type grinders.

In such grinder the work is provided with center holes at its ends for engagement between the head stock and tail stock centers and will withstand relatively great lateral thrust loads for fast metal removal. In the case of a shaft integrally formed with a bevel gear at one end, the manufacture thereof, as from a forging, would involve the following typical steps:

(1) Turning between lathe centers;
(2) Chucking on a turned diameter for cutting of the gear teeth;
(3) Heat treating and straightening;
(4) Grinding bearing diameters and thrust faces on a cylindrical grinder.

When an ordinary gear chuck is used on the head stock of the cylindrical grinder when grinding the bearing diameters, the eccentricity of the teeth with respect to the work centers will cause the gear to "walk" or "cam" on the locators of the gear chuck thereby causing small flats to be ground on the bearing diameters. Such eccentricity and walking may have resulted, for example, from off-center chucking during the gear cutting operation, from imperfect straightening of the work following heat treatment, and from eccentricity of the tail stock work center of the grinder with respect to the axis of rotation of the head stock.

Accordingly, it is a principal object of this invention to provide a chuck for gears and the like in which there is provided a floating work center which takes over the work-holding function after the work locators have been moved out of engagement with the gear teeth.

It is another object of this invention to provide a chuck for gears and the like which has a plurality of work-locating pins adapted to be engaged between the teeth of a gear, one of said pins being a spring-loaded driver operative to rotate the work with chuck while the gear is firmly held and supported by a work center engaged in the center hole thereof; and the work center, at the time that the gear is located by the locating pins, being floatable laterally according to the position of the gear as determined by the locating pins.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a longitudinal cross-section view through a gear chuck embodying the present invention, the chuck being shown in condition wherein the gear is located by pins and the work-center has floated according to the location of the gear by the pins;

FIG. 2 is a view like FIG. 1 except illustrating the manner of locking the floating center and of releasing the locating pins from engagement between the teeth of the gear; and FIG. 3 is a transverse cross-section view taken substantially along the line 3—3, FIG. 1.

Referring now in detail to the drawing, and first to FIG. 1, the work W herein shown for purpose of illustration only comprises a bevel pinion 1 having an integral shaft 2 of which the portion 3 adjacent the bevel pinion 1 is desired to be ground concentric with respect to the bevel pinion 1. The shaft 2 shown in FIG. 1 is provided with the usual center holes 4 and 5 at its opposite ends for mounting in a center-type cylindrical grinding machine. Thus, the center hole 4 at the right is engaged as by the work center 6 of the tailstock of the machine and the center hole 5 at the left is engaged by a work center 7 formed as a part of the chuck 8 herein.

The chuck 8 as herein shown comprises base plates 9 and 10 secured together as by screws 11 and of which the plate 9 is mounted on the flange 12 of the grinder spindle 14 as by a circular series of screws 15. Extending rearwardly through the spindle 14 is an axially reciprocable draw bar 16 on the front end of which is mounted the flanged actuator 17 which is secured by screws 18 to the intermediate plate 19, to which plate 19, in turn, is secured the locating pin carrier ring 20 as by screws 21. The intermediate ring or plate 19 has a central opening 23 therethrough through which the work-center 7 projects, said work center 7 comprising, for example, a tungsten carbide ball 25 brazed or otherwise secured, in the socket of a base part 26. The base part 26, in turn, is held in the socket of a boss 27 as by screw 28.

The actuator 17 is formed with three or more radial slots 29 into which corresponding arms 30 of the work center part 27 are disposed with radial and circumferential clearance and springs 31 are provided constantly to tend to urge the work-center 7 axially outward to maintain the surfaces 32 of arms 30 in engagement with the plane recessed face 33 of the intermediate plate 19. The work center parts 26 and 27 clear the center hole 23 and form a peripheral groove that carries a rubber-like ring 34 which permits the work-center 7 to be moved in any radial direction depending on the position of the center hole 5 of the work W.

Mounted in the ring 20 are several locating pins 35 which, as the work-center 7, may comprise tungsten carbide balls 36, brazed or otherwise secured to the pins 35, and arranged so that the balls 36 will engage between the teeth 37 of the gear 1 which is to be chucked. One of the locating pins 35 (the top one in FIGS. 1 and 2) is preferably spring-loaded by spring 38 as shown, so as to constitute a driver to rotate the gear 1 in unison with the chuck 8 for grinding the portion 3 adjacent the bevel pinion 1 as with the peripheral face of a grinding wheel 39.

In the loading position, the draw bar 16 is forward so that the surfaces 40 of the arms 30 are spaced approximately 1/16", for example, from the plane face 41 of the base plate 9 whereupon, when the work W is positioned between the tailstock center 6 and the locating pins 35, the work-center 7 will take its position from the gear 1 itself because it is capable of yielding axially and of moving in any radial direction. When the work W is in the FIG. 1 position, it will have shoved the work-center 7 rearwardly until surfaces 40 and 41 are in frictional engagement. Now, when the draw bar 16 is pulled back to the left to the FIG. 2 position, the floating center 7 will be firmly locked in its proper position engaged in the center hole 5 of the work W by reason of firm frictional clamping of the arms 30 thereof between the faces 33 and 41, and at the same time, the ring 20 with its locating pins 35 (except the spring-loaded one) will be retracted axially out of engagement with the teeth 37 of the gear 1. The spring 38 acting on the one pin 35 will yieldably hold it in engagement between two adjacent teeth 37 to serve as a driver for rotating the work W in unison with the chuck 8 while the floating center 7 is held in fixed position. Thus, when the portion 3 of the gear shaft 2 is ground, its centerline will coincide with the axis of rotation of spindle 14 and the centerline of the bevel pinion 1 as previously determined by the now disengaged locating pins 35.

Other modes of applying the principle of the invention may be employed, change being made as regards the details described, provided the features stated in any of the following claims, or the equivalent of such, be employed.

We therefore particularly point out and distinctly claim as our invention:

1. A gear chuck comprising a chuck body having a circular series of locating pins adapted for engagement with the teeth of a gear to center the latter with respect to the chuck, said chuck body also having a radially shiftable work-center adapted for engagement in a center-hole of the gear; means for disengaging all but one of said pins from the gear; and means for locking said work-center to said chuck body in the radially shifted position it assumes when engaged in the center-hole of the pin-centered gear.

2. The chuck of claim 1 wherein one locating pin is spring-loaded to remain in engagement with a gear tooth to prevent rotation of the gear with respect to the chuck.

3. The chuck of claim 1 wherein said locating pins are arranged conically to engage the teeth of a bevel gear and are withdrawn axially of the chuck.

4. A gear chuck for a center-type cylindrical grinding machine of the type having a rotary spindle and a tailstock work-center, said chuck comprising a chuck body secured to said spindle, said chuck body having a circular series of locating pins adapted for engagement with the teeth of a gear formed at one end of a shaft to center the gear with respect to the chuck while a center-hole at the remote end of the shaft is engaged by said tailstock work-center, said chuck body also having a radially shiftable headstock work-center adapted for engagement with a center-hole in the gear end of the shaft; means for disengaging all but one of said pins from the gear; and means for locking said headstock work-center to said chuck body in the radially shifted position it assumes when engaged in the center-hole at the pin-centered end of said shaft.

5. The chuck of claim 4 wherein one locating pin is spring-loaded to remain in engagement with a gear tooth to drive the gear in unison with said spindle.

6. The chuck of claim 4 wherein said locating pins are arranged conically to engage the teeth of a bevel gear and are withdrawn axially of the chuck.

7. The chuck of claim 4 wherein said locating pins are arranged conically to engage the teeth of a bevel gear and are withdrawn axially of the chuck; said means for disengaging said pins comprising an axially reciprocable actuator; and said means for locking said headstock work-center comprising a radially extending arm of said work-center that is frictionally clamped between said actuator and said chuck body when the former is moved in an axial direction disengaging said pins from the gear teeth.

8. The chuck of claim 7 wherein said headstock work-center is spring-biased into the center-hole at the gear end of the shaft while the gear is held in centered position by said pins.

References Cited in the file of this patent

UNITED STATES PATENTS

| | | |
|---|---|---|
| 1,021,011 | Sponable | Mar. 26, 1912 |
| 1,431,761 | Schlaupitz | Oct. 10, 1922 |
| 1,527,067 | Parker | Feb. 17, 1925 |
| 1,565,227 | Garrison | Dec. 8, 1925 |
| 1,799,179 | Reis | Apr. 7, 1931 |
| 2,426,376 | Smallpiece | Aug. 26, 1947 |